(12) United States Patent
Yang et al.

(10) Patent No.: US 12,691,779 B2
(45) Date of Patent: Jul. 28, 2026

(54) MOBILE CHARGING DEVICE AND MOBILE CHARGING METHOD

(71) Applicant: HUNAN XIBAODA INFORMATION TECHNOLOGY CO., LTD, Changsha (CN)

(72) Inventors: Feng Yang, Changsha (CN); Xiaosong Xue, Changsha (CN)

(73) Assignee: HUNAN XIBAODA INFORMATION TECHNOLOGY CO., LTD, Changsha (CN)

( * ) Notice: Subject to any disclaimer, the term of this patent is extended or adjusted under 35 U.S.C. 154(b) by 672 days.

(21) Appl. No.: 18/335,823

(22) Filed: Jun. 15, 2023

(65) Prior Publication Data

US 2024/0383359 A1    Nov. 21, 2024

Related U.S. Application Data

(63) Continuation of application No. PCT/CN2023/097726, filed on Jun. 1, 2023.

(30) Foreign Application Priority Data

May 19, 2023    (CN) .......................... 202310571749.0

(51) Int. Cl.
| | |
|---|---|
| *B60L 53/57* | (2019.01) |
| *B60L 53/16* | (2019.01) |
| *B60L 53/53* | (2019.01) |
| *B60L 53/62* | (2019.01) |
| *B60L 53/67* | (2019.01) |
| *H02J 7/70* | (2026.01) |

(52) U.S. Cl.
CPC ............... *B60L 53/57* (2019.02); *B60L 53/16* (2019.02); *B60L 53/53* (2019.02); *B60L 53/62* (2019.02); *B60L 53/67* (2019.02); *H02J 7/751* (2026.01)

(58) Field of Classification Search
USPC ................. 320/105, 106, 107, 108, 109, 110
See application file for complete search history.

(56) References Cited

U.S. PATENT DOCUMENTS

2023/0278444 A1*  9/2023  Bartels .................... B60L 53/62
                                                                      320/109
2024/0408987 A1*  12/2024  Kuo ........................ B60L 53/65

FOREIGN PATENT DOCUMENTS

| CN | 109217394 A | 1/2019 |
|---|---|---|
| CN | 209748241 U | 12/2019 |
| CN | 216268779 U | 4/2022 |

* cited by examiner

*Primary Examiner* — Brian Ngo
(74) *Attorney, Agent, or Firm* — Nitin Kaushik

(57) ABSTRACT

The present disclosure includes a mobile charging device and a mobile charging method. The mobile charging device includes a mobile vehicle body defining an accommodating chamber; a charging port assembly, arranged in the accommodating chamber including a mounting base and a movable base, the movable base is configured to move back and forth relative to the mounting base in a first direction; a plug assembly, including a charging plug having pins adapted to the charging interface; and a driving mechanism connected with the charging plug, and configured to drive the charging plug to move in the plug hole. The mobile vehicle body provided by the present disclosure charges external devices (electric vehicles) through a charging head.

10 Claims, 15 Drawing Sheets

MOBILE CHARGING DEVICE AND MOBILE CHARGING METHOD

CROSS-REFERENCE TO RELATED APPLICATIONS

The application claims priority to Chinese patent application No. 2023105717490, filed on May 19, 2023, the entire contents of which are incorporated herein by reference.

TECHNICAL FIELD

The present disclosure relates to the field of mobile charging technologies, and in particular, to a mobile charging device and a mobile charging method.

BACKGROUND

With development of electric vehicles, there is a strong demand for energy replenishment, but currently, charging stations are difficult to cover all parking spaces, thereby causing difficulties for charging.

However, when using traditional mobile charging devices to charge electric vehicles, the energy storage capacity of the mobile charging device is usually not too large, which makes it difficult to fully charge the electric vehicles. It may be necessary to insert a mobile charging device into a charging port of an electric vehicle several times to fully charge the electric vehicles, which causes charging intermittent.

SUMMARY

The present disclosure aims to solve at least one of the technical problems existing in the prior art. Therefore, the present disclosure provides a mobile charging device that is convenient for charging and does not require multiple plugging and unplugging of the charging port of an electric vehicle.

In order to solve above-mentioned technological problems, the present disclosure provides a mobile charging device, includes: a mobile vehicle body defining an accommodating chamber configured to accommodate a rechargeable battery, the mobile vehicle body is provided with a charging gun configured to charge an external device, the accommodating chamber defines a plug hole at a sidewall thereof; a charging port assembly, arranged in the accommodating chamber including a mounting base and a movable base, the mounting base is fixedly connected with the mobile vehicle body, the movable base is configured to move back and forth relative to the mounting base in a first direction, the movable base is provided with a charging interface facing outside of the charging port assembly; a plug assembly, movably arranged in the plug hole, a charging plug having pins adapted to the charging interface, the charging plug is configured to move back and forth relative to the mobile vehicle body in a second direction, the second direction is perpendicular to the first direction; and a driving mechanism in the accommodating chamber and is connected with the charging plug, and is configured to drive the charging plug to move in the plug hole. The driving mechanism is configured to drive the charging plug and the pins to move out of the plug hole to insert into a charging interface of another mobile charging device to charge said another mobile charging device.

Preferably, the plug assembly further includes an alignment frame; the alignment frame is arranged around the charging plug; the movable base is provided with an alignment slot around the charging interface, the alignment slot faces outside to allow the alignment frame to insert therein; when the plug assembly is inserted into the movable base of said another mobile charging device, the alignment frame cooperates with the alignment slot to make the pins to be aligned with the charging interface of said another mobile charging device.

Preferably, the first direction is vertical, the second direction is left and right horizontal, and the plug hole is arranged on a front side of the mobile vehicle body.

Preferably, two extension plates extend from left and right sides of the alignment frame respectively, and two first outer plates are provided at rear ends of the two extension plates respectively, two second outer plates are arranged on left and right sides of a rear end of the alignment frame, and first springs are arranged between the first outer plate and the second outer plates.

Preferably, two first guiding columns extend backwards from the second outer plates respectively, the first outer plate is provided with first guide holes configured to allow the first guiding columns to pass through, rear ends of the first guiding columns passes through the first guide holes and are connected to first limit nuts respectively, a size of each first limit nut is greater than that of a corresponding first guide hole, each first spring is a compression spring sleeving on a corresponding first guide column, two opposite ends of each compression spring resists against a corresponding first outer plate and a corresponding second outer plate.

Preferably, a sidewall of the alignment slot is provided with a clamping slot, a sidewall of the alignment frame is provided with a buckle, the buckle is configured to be switchable between a retracted state where the buckle is retracted within the alignment frame and a clamped state where the buckle partially extends into the clamping slot; when a front end of the alignment frame is inserted into the alignment slot of said another mobile charging device and resists against the front sidewall of the alignment slot, the charging plug continues to move forward relative to the alignment frame, which pushes the buckle to be switched from the retracted state to the clamped state, the buckle in the clamped state cooperates with the clamping slot of said another mobile charging device, which limit relative movement between the alignment frame and the movable base in forward and backward directions; after the charging plug pushes the buckle to the clamped state, the charging plug continues to move forward to insert the pins into the charging interface of said another mobile charging device.

Preferably, a sidewall of the alignment frame is provided with a through hole for mounting the buckle, the buckle is hinged in the through hole through a hinge shaft, and a torsion spring is mounted on the hinge shaft to keep the buckle in the retracted state without external force.

Preferably, both left and right edges on the inner side of the plug hole are provided with convex blocks configured to resist against the second outer plate to limit travel of the alignment frame extending out of the plug hole, the convex blocks on both sides are provided with first elastic components configured to apply elastic forces to left and right sides of the alignment frame.

Preferably, the charging port assembly includes a second elastic component; the charging port assembly is mounted on a rear side of the mobile vehicle body; a front end of the movable base is sequentially connected with a connecting column and a ball, and the movable base is configured to rotate along the ball relative to the mounting base; the mounting base is provided with a mounting chamber having an opening at a rear end thereof, a front sidewall of the mounting chamber is provided with a sliding bar extending in the first direction, the sliding bar defines a sliding slot configured to allow the ball to move in the first direction, and a rear end of the sliding slot is provided with an opening configured to allow the connecting column to extend out of the sliding slot, a width of the opening is greater than a width of the connecting column and smaller than a diameter of the ball; and the number of the second elastic component is multiple, multiple second elastic components are distributed circumferentially on an inner sidewall of the mounting chamber and configured to provide elastic forces to the movable base when compressed.

The present disclosure further provides a mobile charging method, includes following steps:

moving the mobile charging device to a device to be charged, and inserting the charging gun into a charging port of the device to be charged;

marking when the mobile charging device to be a low battery charging device when the battery of the mobile charging device falls below a predetermined threshold; and driving another mobile charging device to move next to the low battery charging device, and insert the pins of said another mobile charging device into the charging interface of the low battery charging device to charge the low battery charging device.

The present disclosure has following beneficial effects:

The mobile vehicle body charges external devices (electric vehicles) through a charging head. When the mobile vehicle body is low in power, it can be charged by another mobile vehicle body so as to continuously charge the electric vehicle, avoiding multiple plugging and unplugging of the charging port of the electric vehicle, making charging more convenient. And the charging plug can be driven by the driving mechanism to extend out of the plug hole and to be inserted into the charging interface of another mobile charging device, thereby achieving automatic docking charging.

Except for the purposes, features, and advantages described above, the present disclosure also has other purposes, features, and advantages. The present disclosure will be further explained in detail below with reference to the figures.

BRIEF DESCRIPTION OF DRAWINGS

The accompanying drawings forming a part of the present disclosure are used to provide a further understanding of the present disclosure, and exemplary embodiments and descriptions thereof are used to explain the present disclosure and do not constitute an improper limitation of the present disclosure. In attached figures.

Figure 1:
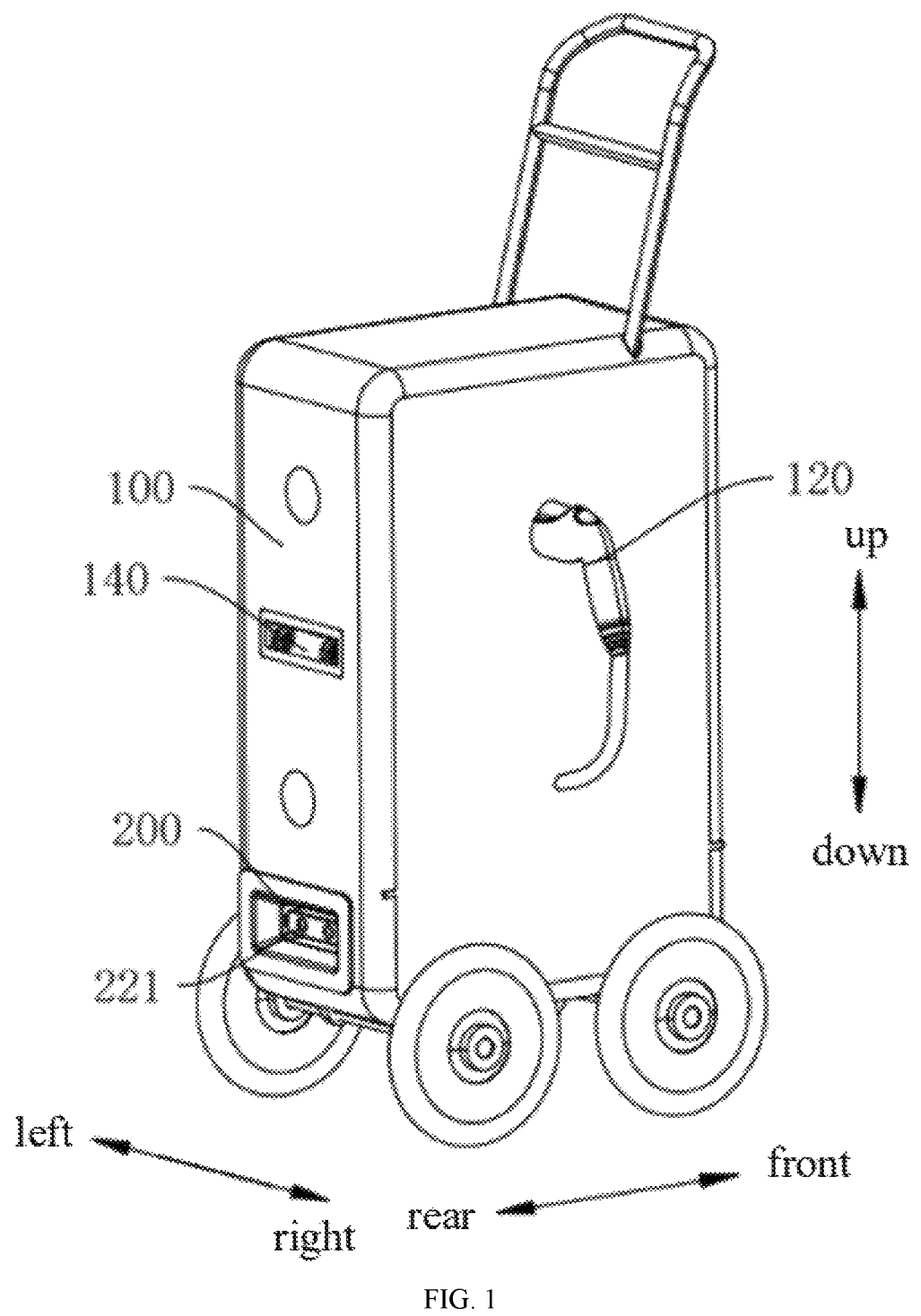
FIG. 1 is a schematic view of an outside structure of a mobile charging device in accordance with one embodiment of the present disclosure.
Figure 2:
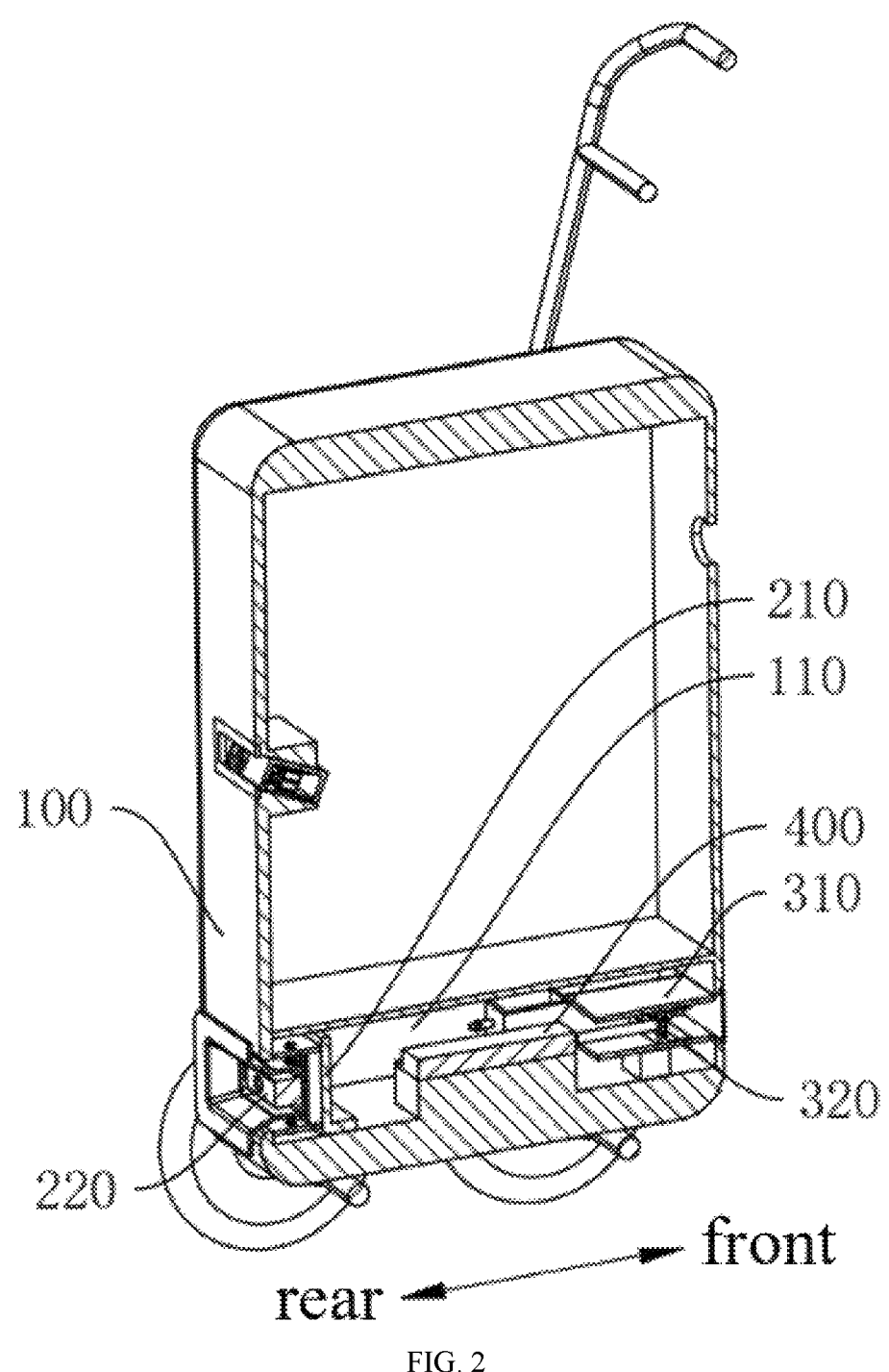
FIG. 2 is a schematic view of the outside structure of the mobile charging device taken from another view.

IN THE FIGURES mobile vehicle body 100, accommodating chamber 110, plug hole 111, convex block 112 charging gun 120, polygonal column 130, end seat 131, pulley 132, second pressure spring 133, third limit nut 134, charging socket 140, cover 150;

charging port assembly 200, mounting base 210, mounting chamber 211, sliding bar 212, sliding slot 213, opening 214, mounting vertical plate 215, box 216, wire hole 217, movable base 220, charging interface 221, alignment slot 222, clamping slot 223, limit frame 224, flared frame 225, connecting column 226, ball 227, blocking frame 228, second elastic element 230, guide column 231, column head 232, first compression spring 233, second limit nut 234;

plug assembly 300, alignment frame 310, second outer plate 311, first guiding column 312, first limit nut 313, through hole 314, charging plug 320, pins 321, extension plate 322, first outer plate 323, first guide hole 324, open groove 325, strip opening 326, passage 327, first spring 330, buckle 340, hook portion 341;

driving mechanism 400, telescopic rod 410, limit head 411.

DETAILED DESCRIPTION OF THE EMBODIMENTS

It should be understood that specific embodiments described here are only intended to explain the present disclosure and are not intended to limit it.

The following will provide a clear and complete description of the technical solution in the embodiments of the present disclosure in conjunction with the accompanying drawings. Obviously, the described embodiments are only a part of the embodiments of the present disclosure, not all of them. Based on the embodiments in the present disclosure, all other embodiments obtained by ordinary person skilled in the art without creative labour fall within the scope of protection of the present disclosure.

It should be noted that all directional indications (such as up, down, left, right, front, rear . . . ) in the embodiments of the present disclosure are only used to explain the relative position relationship, motion situation, and etc. among components in a specific posture (as shown in the attached figures). If the specific posture changes, the directional indication also changes accordingly.

In addition, the description of "first", "second", and etc. in the present disclosure is only for descriptive purposes and cannot be understood as indicating or implying their relative importance or implying the number of indicated technical features. Therefore, features limited to "first" and "second" can explicitly or implicitly include at least one of these features. Furthermore, the technical solutions between various embodiments can be combined with each other, but must be based on the ability of ordinary person skilled in the art to achieve. When the combination of technical solutions conflicts or cannot be achieved, it should be considered that the combination of such technical solutions does not exist and is not within the protection scope required by the present disclosure.

Referring to FIGS. 1-8, a mobile charging device provided by an embodiment of the present disclosure includes a mobile vehicle body 100, a charging port assembly 200, a plug assembly 300, and a driving mechanism 400.

The mobile vehicle body 100 defines an accommodating chamber 110 inside. The accommodating chamber 110 is configured to accommodate a rechargeable battery. The mobile vehicle body 100 is provided with a charging gun 120 configured to charge an external device. The accommodating chamber 110 defines a plug hole 111 at a sidewall thereof. It should be understood that the charging gun 120 is connected with the rechargeable battery so as to discharge electrical energy of the rechargeable battery. The rechargeable battery may be a lithium iron phosphate battery, a ternary lithium battery or other rechargeable battery commonly used in the market. The mobile vehicle body 100 is provided with a charging socket 140 configured to be connected with a fixed charging station to achieve power replenishment.

The charging port assembly 200 is mounted in the accommodating chamber 110 and includes a mounting base 210 and a movable base 220. The mounting base 210 is fixedly connected with the mobile vehicle body 100. The movable base 220 can move back and forth relative to the mounting base 210 in a first direction. The movable base 220 is provided with a charging interface 221 facing outside of the charging port assembly 200. The charging interface 221 faces outside, which facilitates an external plug structure to insert. It should be understood that a sidewall of the mobile vehicle body 100 corresponding to the charging port assembly 200 is provided with a pocket hole to expose the charging interface 221.

The plug assembly 300 is movably arranged in the plug hole 111. The plug assembly 300 includes a charging plug 320 having pins 321 adapted to the charging interface 221. The pins 321 can extends out of the plug hole 111. The charging plug 320 can move back and forth relative to the mobile vehicle body 100 in a second direction. The second direction is perpendicular to the first direction.

Figure 9:
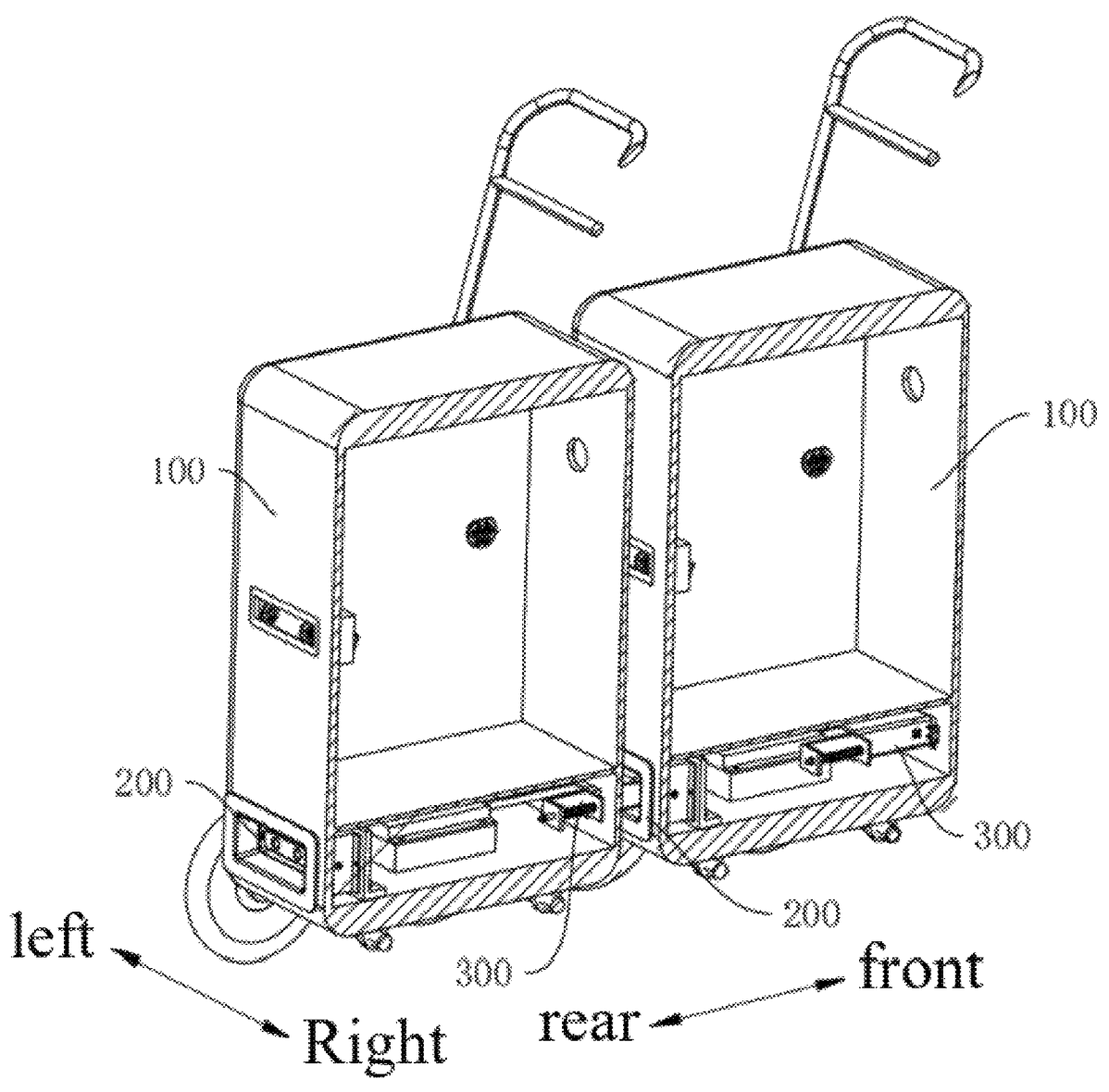
FIG. 9 is a schematic view of charging another mobile charging device with the mobile charging device.

The driving mechanism 400 is mounted in the accommodating chamber 110 and is connected with the charging plug 320, and is configured to drive the charging plug 320 to move in the plug hole 111. Referring to FIG. 9, the driving mechanism 400 can drive the charging plug 320 and the pins 321 to move out of the plug hole 111 to insert into a charging interface 221 of another mobile charging device, thereby charging said another mobile charging device. It should be understood that the charging plug 320 can be connected with the rechargeable battery through wires to transmit obtained power to the rechargeable battery to charge the rechargeable battery.

The present disclosure provides the mobile charging device, in which the mobile vehicle body 100 charges external devices (electric vehicles) through the charging gun 120. When the mobile vehicle body 100 is low in power capacity, another mobile vehicle body 100 can be used to continuously charge the electric vehicle, prevent the charging port from damage due to multiple plugging and unplugging of the charging interface of the electric vehicle, and protect the rechargeable battery from intermittent charging, which affects the battery life badly. It is convenient for continuous charging. Furthermore, in the mobile vehicle body 100, the driving mechanism 400 can drive the pins 321 to move out of the plug hole 111 to insert into a charging interface 221 of another mobile vehicle body 100, thus achieving automatic docking and charging and automatic power replenishment.

Figure 3:
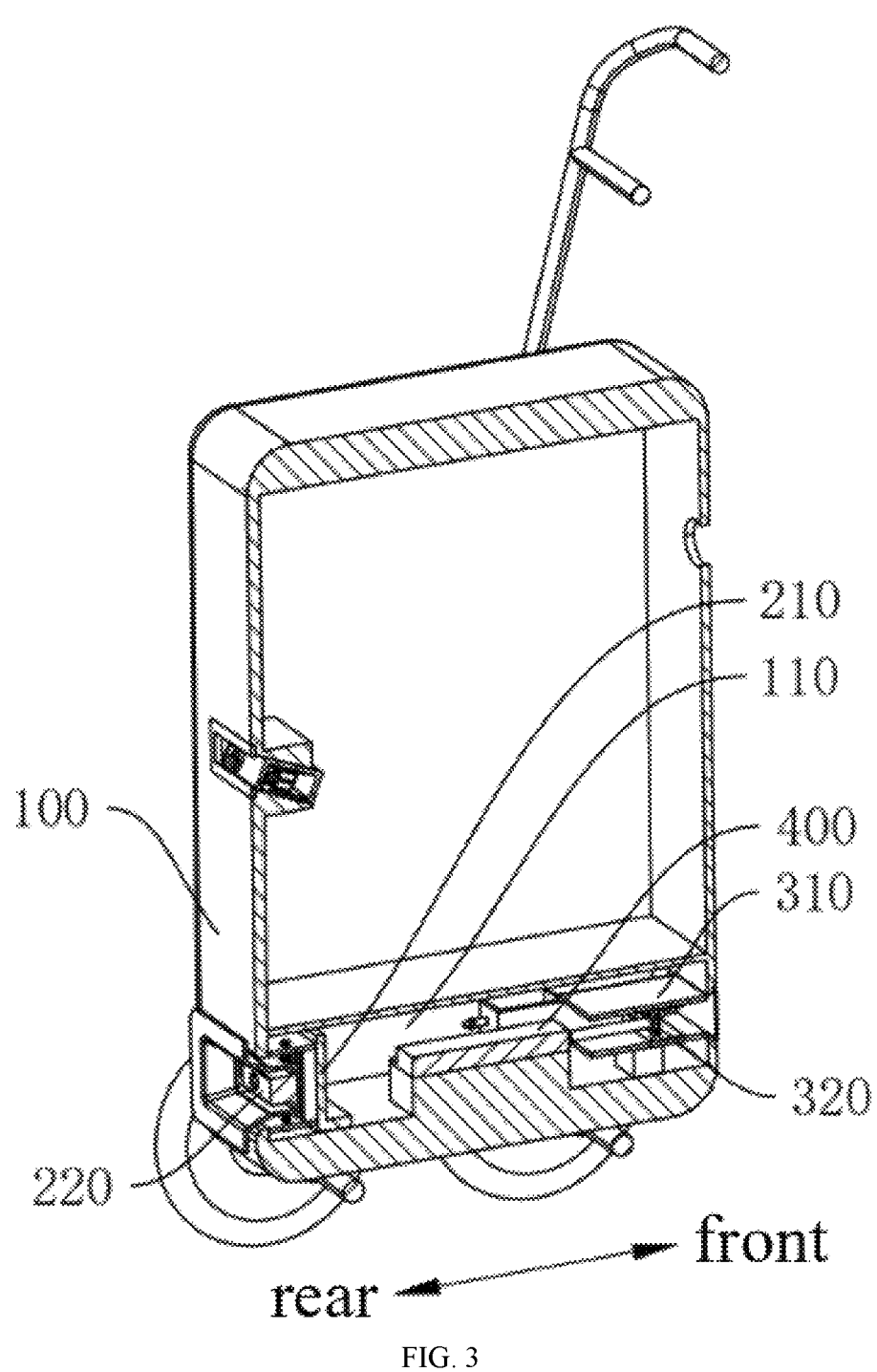
FIG. 3 is a cross sectional view of the mobile charging device.
Figure 13:
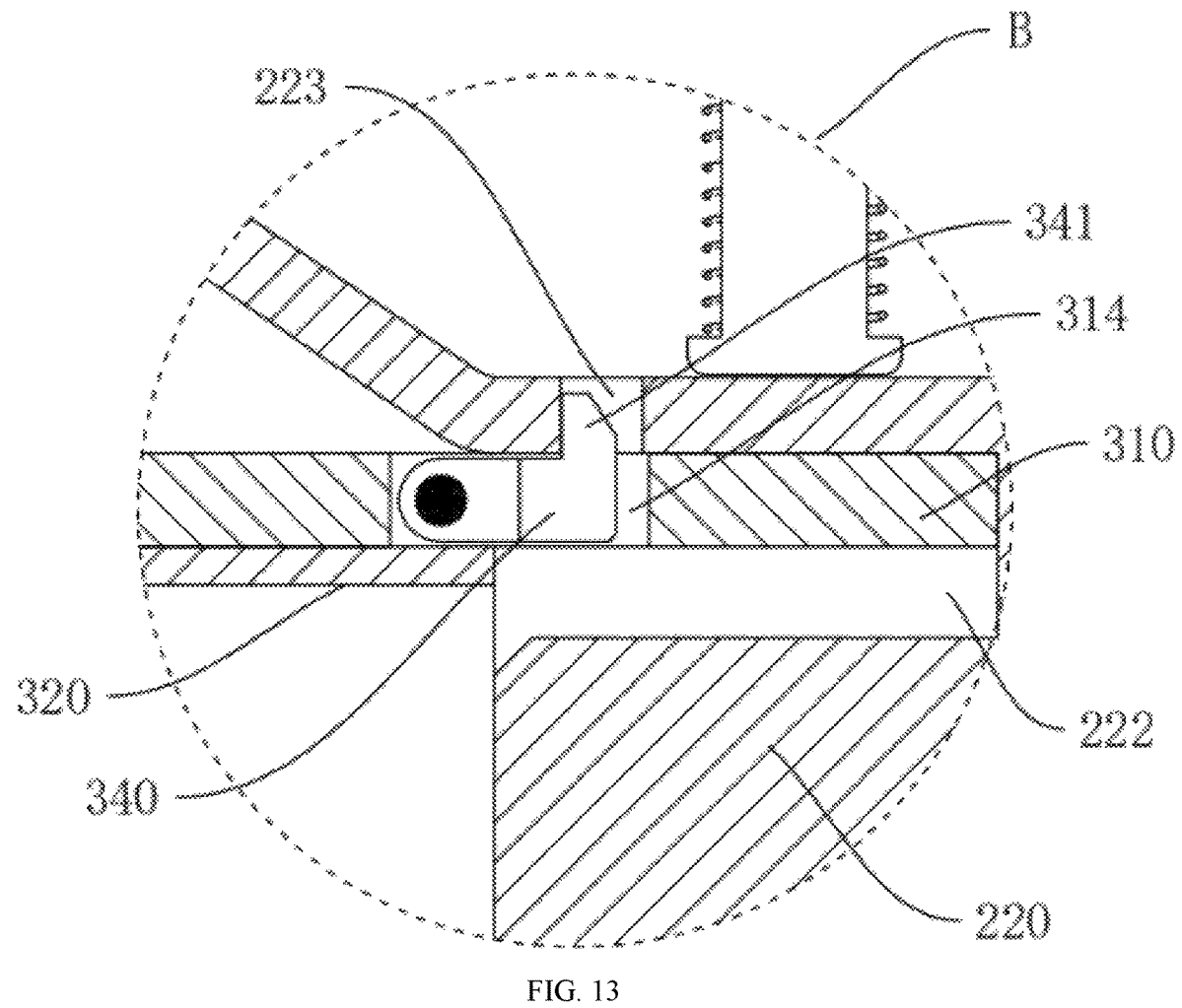
FIG. 13 is an enlarged view of the portion B shown in FIG. 12.

Referring to FIGS. 3 and 13, in some embodiments of the present disclosure, the plug assembly 300 further includes an alignment frame 310 arranged around the charging plug 320. The movable base 220 is provided with an alignment slot 222 around the charging interface 221. The alignment slot 222 faces outside so as to allow the alignment frame to insert therein. When the plug assembly 300 is inserted into a movable base 220 of another mobile charging device, the alignment frame 310 cooperates with the alignment slot 222 to ensure the pins 321 are aligned with the charging interface 221 of said another mobile charging device, thereby avoiding incorrect plugging.

Figure 4:
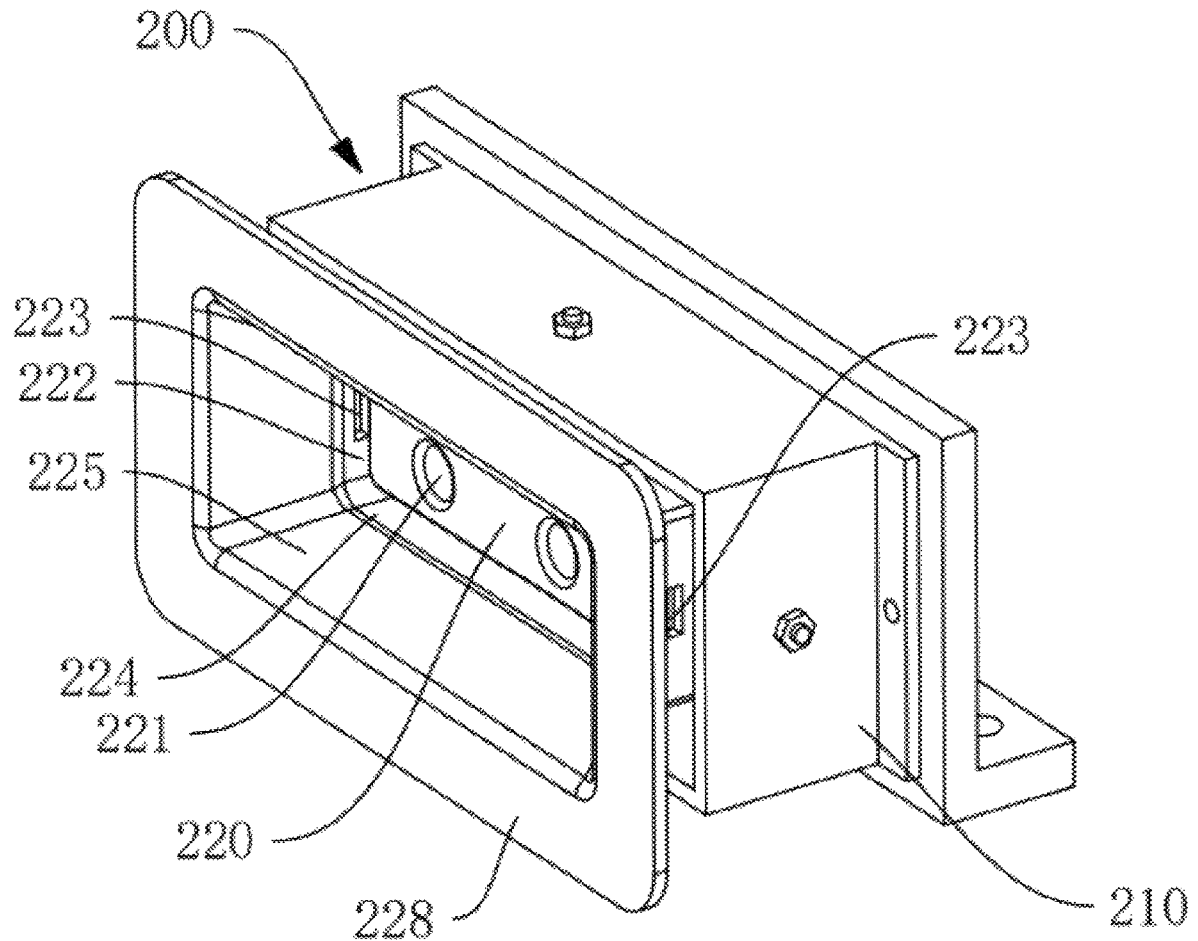
FIG. 4 is a schematic view of a charging port assembly.
Figure 5:
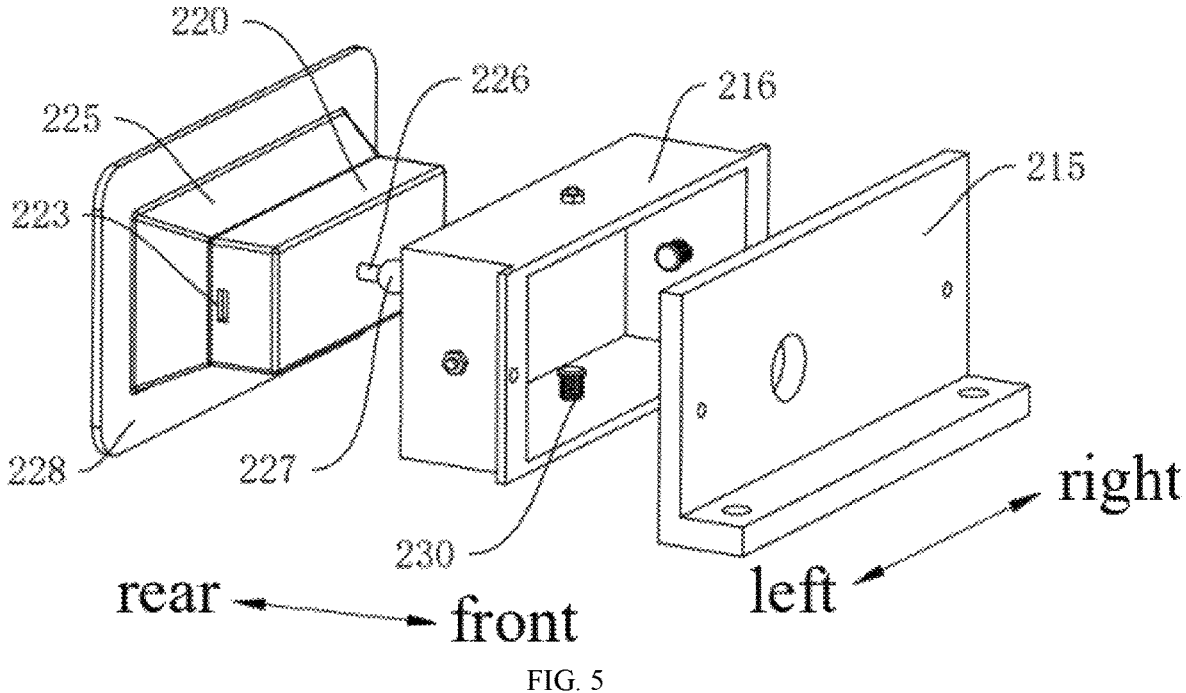
FIG. 5 is an exploded view of the charging port assembly of FIG. 4.
Figure 6:
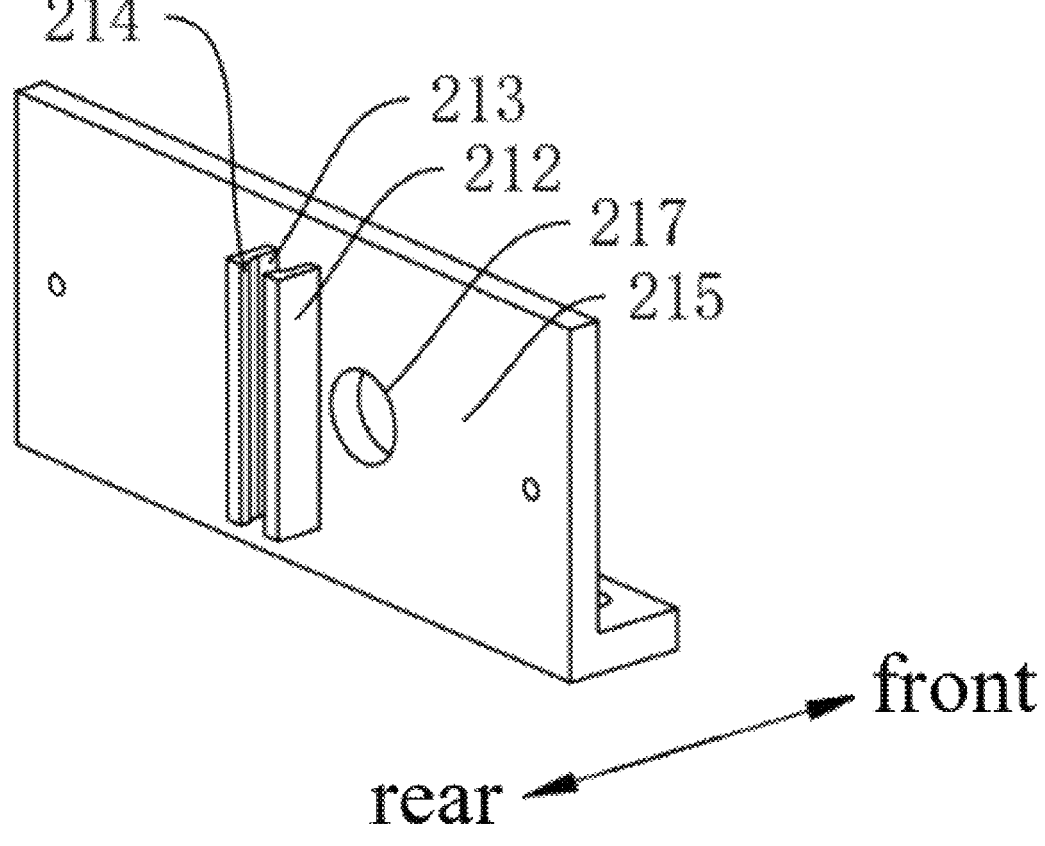
FIG. 6 is a schematic view of a mounting plate.

Referring to FIGS. 4, 5 and 6, the charging port assembly 200 further includes a second elastic component 230. The charging port assembly 200 is arranged at a rear side of the mobile vehicle body 100. The rear side of the mobile vehicle body 100 is provided with a pocket hole to expose the charging interface 221. When the plug hole 111 is arranged at a front side of the mobile vehicle body 100 and the mobile charging device is used to charge another mobile charging device, the mobile charging device is moved to a rear side of said another mobile charging device and the plug hole 111 is aligned with said another mobile charging device, and the pins 321 is driven to move forward to insert into the charging interface 221 of said another mobile charging device. A connecting column 226 and a ball 227 are sequentially connected to a front side of the movable base 220. The movable base 220 can rotate around the ball 227 relative to the mounting base 210. The mounting base 210 is provided with a mounting chamber 211 having an opening at a rear side thereof. A font sidewall of the mounting chamber is provided with a sliding bar 212. The sliding bar 212 extends in the first direction. The sliding bar 212 defines a sliding slot 213 configured to allow the ball 227 to move in the first direction. The first direction is the vertical direction of up and down, that is, both the sliding slot 213 and the sliding bar 212 extend along the vertical direction of up and down. Through sliding cooperation between the ball 227 and the sliding slot 213, sliding of the movable base 220 in the first direction is achieved, and through rotation of the ball 227, the rotation of the movable base 220 is achieved, thereby achieving two-dimensional movement of the movable base 220. It can improve adaptability range of the movable base 220. The movable base 220 can not only adapt to charging plugs 320 at different height positions, but also adapt to insertion of charging plugs 320 at a certain tilt angle.

A rear end of the sliding slot 213 is provided with an opening 214 configured to allow the connecting column 226 to extend out of the sliding slot 213. A width of the opening 214 is greater than a width of the connecting column 226 and smaller than a diameter of the ball 227. The opening 214 extends vertically, so that when the movable base 220 rotates and swings up and down, the connecting column 226 can also rotate and swing in the opening 214. The opening 214 avoids structural interference between the sliding bar 212 and the connecting column 226. The width of the opening 214 is smaller than the diameter of the ball 227, ensuring that the ball 227 is confined within the sliding slot 213 and will not be detached out from the sliding slot 213 through the opening 214. The width of the opening 214 is greater than the width of the connecting column 226, which allows the connecting column 226 to rotate and swing left and right within a certain range along the ball 227, increasing the range of rotation. This makes the movable base 220 not only able to swing up and down but also can swing left and right, making it more convenient for insertion of charging plugs 320 at different insertion angles. Of course, it can be understood that if the connecting column 226 is a cylinder, its width size is its diameter.

In some specific embodiments of the present disclosure, the mounting base 210 includes a mounting vertical plate 215 and a box 216 arranged at a rear end of the mounting vertical plate 215. The mounting cavity 211 is defined by the box 216 and the front end of the mounting vertical plate 215, and the sliding bar 212 is arranged at the rear end of the mounting vertical plate 215. The mounting base 210 is formed by two components, which is convenient for mounting the sliding bar 212 and the sliding slot 213, thereby reducing difficulty of processing. In addition, for convenience of line layout, a wire hole 217 is defined on the vertical plate 215 for lines connected to the charging interface 221 to pass therethrough. In addition, end faces of upper and lower ends of the sliding bars 212 are aligned with inner walls of the upper and lower ends of the box 216, thereby achieving a certain positioning effect.

Specifically, a front side of the box 216 is provided with a connecting side plate, and the connecting side plate and the mounting vertical plate 215 are provided with corresponding holes to be connected and fixed by screws, thereby achieving connection between the two. In addition, in order to facilitate installation of the charging port assembly in the accommodating chamber 110, a horizontal bottom plate is provided at a bottom of the vertical plate 215, and the bottom plate is provided with holes configured to allow fasteners to pass through to mount the bottom plate in a corresponding charging device.

The number of the second elastic component 230 can be multiple, multiple second elastic components 230 are distributed circumferentially on an inner sidewall of the mounting chamber 211 and configured to provide elastic forces to the movable base 220 when compressed, which can keep the movable base 220 in a stable position and facilitate alignment when not subjected to external forces. The movable base 220 is usually centred in the mounting chamber 211. When not subjected to external forces, a centre of the movable base 220 is aligned with a centre of the mounting chamber 211.

Referring to FIGS. 4 and 5, in further embodiments of the present disclosure, a limit frame 224 around a periphery of the movable base 220. The limit frame 224 is circled around an outer circumference of the movable base 220, and the alignment slot 222 is defined by the limit frame 224 and the movable base 220. A front end of the limit frame 224 is fixedly connected to a front end of the movable base 220 to close a front side of the alignment slot 222, so that when the alignment frame 310 is inserted, it contacts a front wall closing the front side of the alignment slot 222, and the second elastic component 230 contacts the limit frame 224 to apply an elastic force to the movable base 220. Furthermore, in order to increase a range of the limit frame 224 for receiving the alignment frame 310, a rear end of the limit frame 224 is provided with a flared frame 225 that faces backwards. The flared frame 225 can increase an insertion range of the alignment frame 310, preventing the alignment frame 310 from being misaligned with the alignment slot 222 (i.e. the pins 321 is misaligned with the charging interface 221). The receiving range can be increased through the flared frame 225, and an inner size of the flared frame 225 gradually narrows from the rear end to the front end, which helps to gradually align the alignment frame 310 with the alignment slot 222. In addition, in order to block the gap between the flared frame 225 and the pocket hole of the mobile vehicle body 100, a blocking frame 228 can be arranged at the rear end of the expansion frame 225.

Referring to FIGS. 4 and 5, in a specific embodiment of the present disclosure, the number of the second elastic component 230 is four, and four second elastic component 230 are arranged on the four sidewalls of box 216, respectively, to provide elastic support for the movable base 220 from four directions. The elastic support from multiple directions to the movable base 220 can help to maintain the movable base 220 in a stable state when not subjected to external forces. When the charging plug 320 is withdrawn, the movable base 220 can automatically restore to the centre position in the mounting chamber 211, which is convenient for next plug insertion, and ensures that the position of charging interface 221 relative to the mobile vehicle body 100 remains substantially unchanged when it is in an initial state for insertion.

Figure 11:
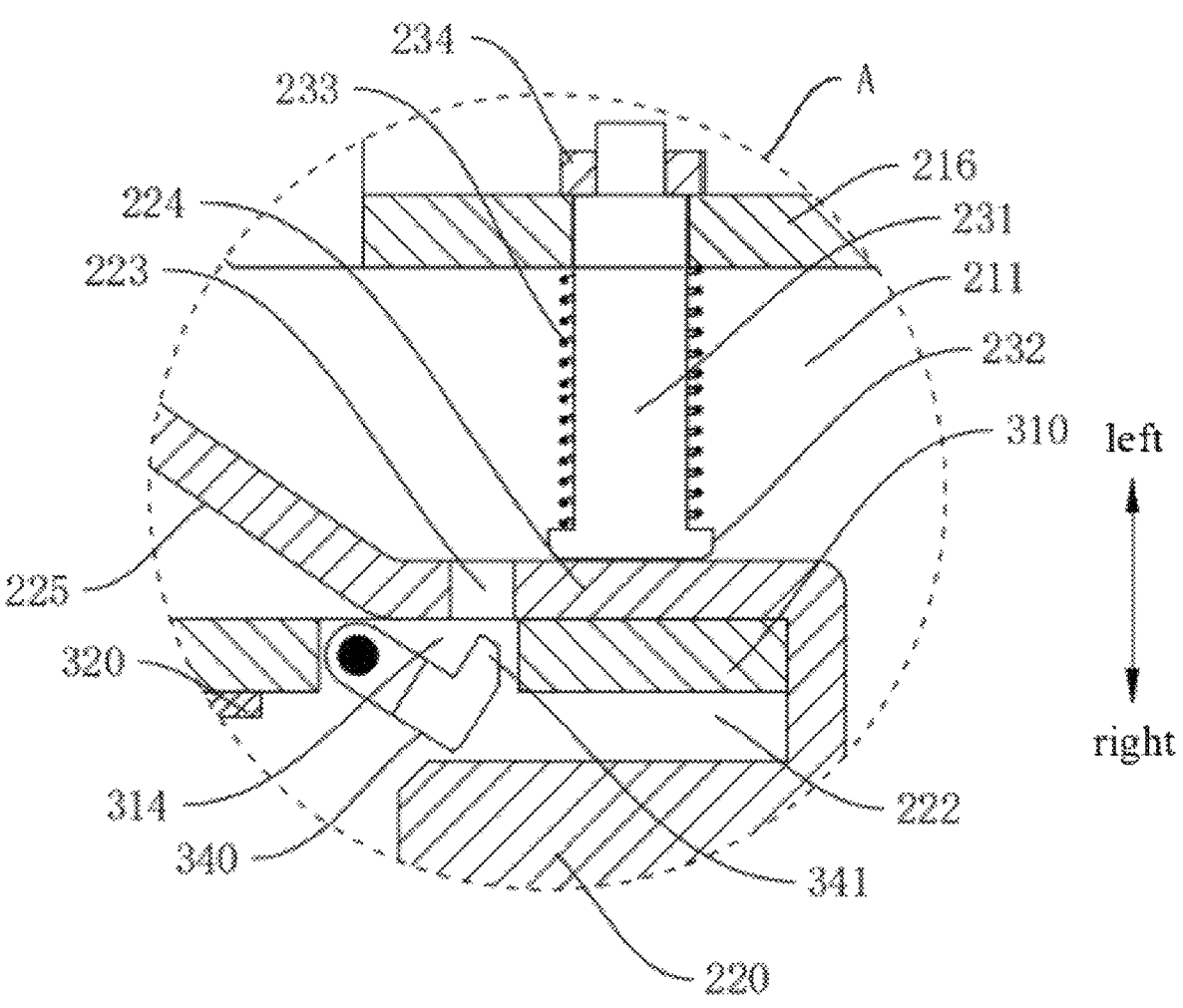
FIG. 11 is an enlarged view of the portion A shown in FIG. 10.

Referring to FIG. 11, in a specific embodiment of the present disclosure, the second elastic component 230 includes a guide column 231, a column head 232, a first compression spring 233, and a second limit nut 234. The guide column 231 is movably installed on the sidewall of the mounting chamber 211, that is, it is movably mounted on the sidewall of the box 216. The sidewall of the mounting chamber 211 (the sidewall of the box 216) is provided with a guide hole corresponding to the guide column 231. The column head 232 is arranged at one end of the guide column 231 towards the movable base 220, and a cross-sectional profile of the column head 232 is greater than that of the guide column 231, that is, a diameter of the column head 232 is greater than that of the guide column 231. The first pressure spring 233 is sleeved on the guide column 231 and is arranged between the column head 232 and the sidewall of the mounting chamber 211. A diameter of the first pressure spring 233 is smaller than that of the column head 232, and both ends of the first pressure spring 233 resists against the column head 232 and the sidewall of the mounting chamber 211. The first pressure spring 233 provides an elastic force to the column head 232. The column head 232 resists against the limit frame 224. The second limit nut 234 is mounted at one end of the guide column 231 extending out of the mounting chamber 211 to limit movable travel of the guide column 231. A diameter of the second limit nut 234 is larger than the guide hole, so it cannot pass through the sidewall of the mounting chamber 211, thereby achieving limit of elastic travel. The end of the guide column 231 is provided with a threaded shaft configured to be threaded with the second limit nut 234.

In some embodiments of the present disclosure, the first direction is vertical, the second direction is left and right horizontal, and the plug hole 111 is located on the front side of the mobile vehicle body 100 in the vertical direction, i.e. up and down direction. Thus, when the charging plug 320 is matched with the movable base 220, the charging plug 320 and the movable base 220 can adaptively adjust their positions, the pins 321 can adaptively adjust their left and right directions, and the charging interface 221 can adaptively adjust its position along the up and down directions, so that when the pins 321 and the charging interface 221 are misaligned, they can adaptively adjust their positions to align with each other, improving the range of alignment and insertion.

Figure 7:
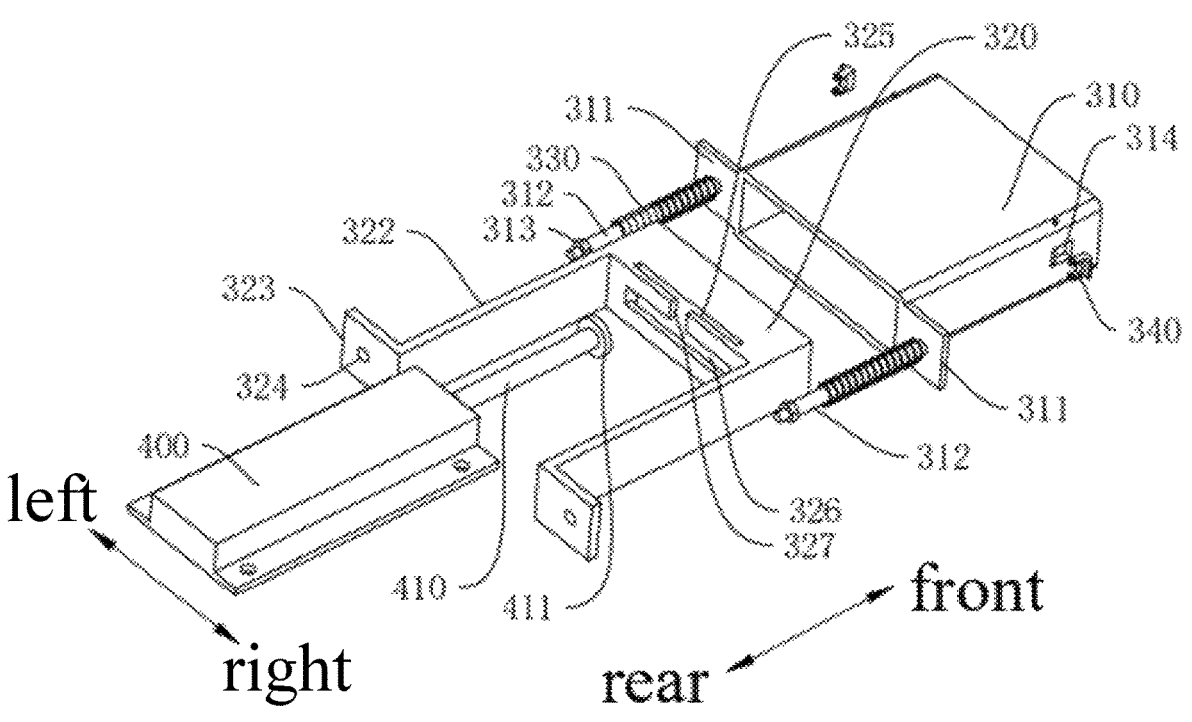
FIG. 7 is an exploded view of a plug assembly.
Figure 8:
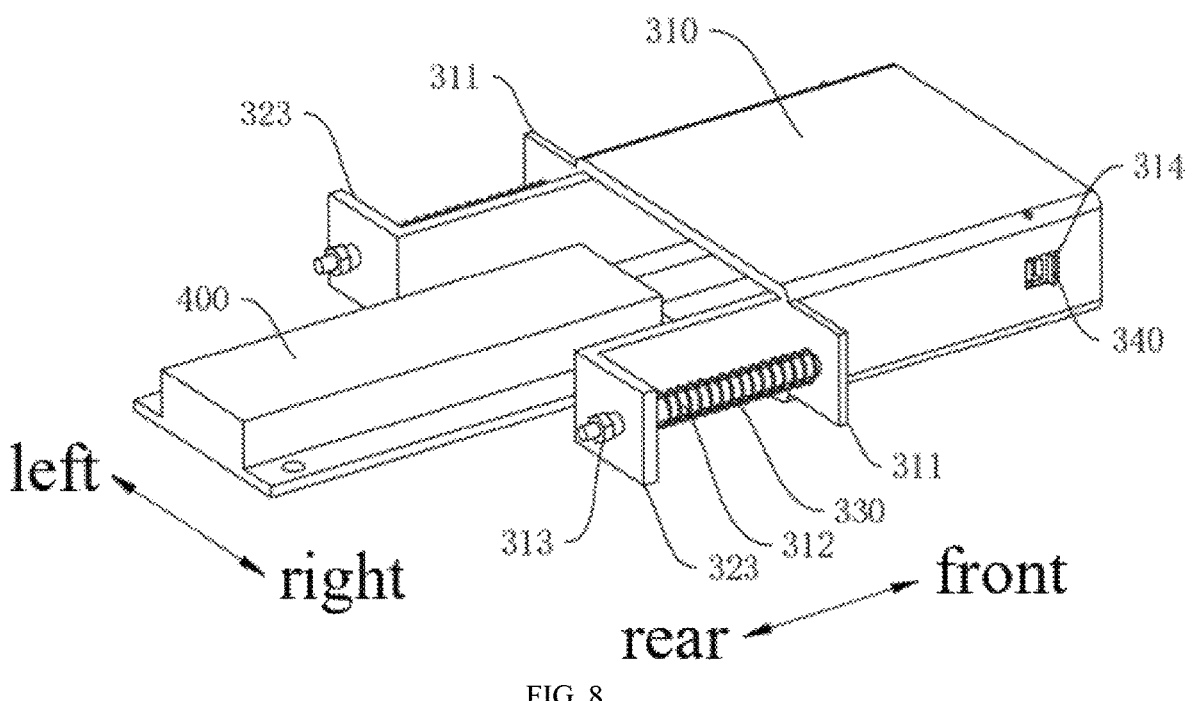
FIG. 8 is a schematic view of the plug assembly in an assembled state.

Referring to FIGS. 7 and 8, in further embodiments of the present disclosure, two extension plates 322 extends from the left and right sides of the alignment frame 310, and two first outer plates 323 are provided at rear ends of the two extension plates 322 respectively. Each of the first outer plates 323 is perpendicular to a corresponding extension plate 322, and the two first outer plates 323 extends from the rear ends of the two extension plates 322 to in two opposite directions. That is, the first outer plate 323 on the left extends to the left from the rear end of the extension plate 322 on the left, and the first outer plate 323 on the right extends to the right from the rear end of the extension plate 322 on the right. On the left and right sides of the rear end of the alignment frame 310, there are two second outer plates 311. The two second outer plates 311 extend from the rear end of the alignment frame 310 in two opposite directions. That is, the second outer plate 311 on the left extends towards the left from a left side of the rear end of the alignment frame 310, and the second outer plate 311 on the right extends towards the right from a right side of the rear end of the alignment frame 310. There are two first springs 330 arranged between the first outer plates 323 and the second outer plates 311, which enables the driving mechanism 400 to drive the charging plug 320 to move forward. The first spring 330 drives the alignment frame 310 to move forward, and when the alignment frame 310 collides with an external structure, the first spring 330 can provide certain elastic buffering.

In further embodiments of the present disclosure, two first guiding columns 312 extend backwards from the second outer plates 311 respectively. The first outer plate 323 is provided with first guide holes 324 configured to allow the first guiding columns 312 to pass through, rear ends of the first guiding columns 312 passes through the first guide holes 324 and are connected to first limit nuts 313 respectively. The contour of the first limit nut 313 is larger than that of the first guide hole 324, thereby avoiding the first guide column 312 from detaching from the first guide hole 324. When the charging plug 320 retracts backwards to the accommodating chamber 110, the first outer plate 323 resists against the first limit nut 313, thereby driving the alignment frame 310 to move backwards, achieving retraction movement of the alignment frame 310. The first spring 330 is a compression spring sleeving on the first guide column 312, with both ends of the compression spring contacting the first outer plate 323 and the second outer plate 311 to provide elastic forces. The first guide column 312 also provides an installation position for the first spring 330.

Referring to FIGS. 4 and 7, in further embodiments of the present disclosure, a sidewall of the limit frame 224 is provided with a clamping slot 223, and a sidewall of the alignment frame 310 is hinged with a buckle 340. The buckle 340 has a retracted state where the buckle 340 is retracted within the alignment frame 310 and a clamped state where the buckle 340 partially extends into the clamping slot 223. The forward and backward movement of the charging plug 320 relative to the alignment frame 310 can achieve switching of the buckle 340's state. When the front end of the alignment frame 310 is inserted into the alignment slot 222 of another mobile charging device and resists against the front sidewall of the alignment slot 222, it reaches the state shown in FIG. 10. Then, the charging plug 320 continues to move forward relative to the alignment frame 310, which can push the buckle 340 from the retracted state to the clamped state, reaching the state shown in FIG. 12, so that the buckle 340 in the clamped state matches with the clamping slot 223 of another mobile charging device. Thus, relative movement between the alignment frame 310 and the movable base 220 of another mobile charging device in the forward and backward directions is limited. At this time, the alignment frame 310 and the movable base 220 cannot move relative to each other in the forward and backward directions, and their positions are locked. After the charging plug 320 pushes the buckle 340 to the clamped state, the charging plug 320 continues to move forward to insert the pins 321 into the charging interface 221 of another mobile charging device, thus achieving charging docking. During the process of inserting the pin 321 into the charging interface 221 of another mobile charging device, the charging plug 320 always resists against the buckle 340, thereby keeping the buckle 340 in the clamped state and avoiding unwanted changes in its state. Specifically, as shown in FIG. 13, the buckle 340 has a protruding hook portion 341. When the buckle 340 is in the clamped state, the hook portion 341 is clamped into the clamping slot 223, so that the alignment frame 310 cannot retract relative to the movable base 220. In addition, the charging plug 320 is provided with a slot with an open front end, and the pins 321 are located inside the slot. The slot can be used for receiving the movable base 220, thereby reducing an overall size of the charging plug 320 in the front and rear directions.

Figure 10:
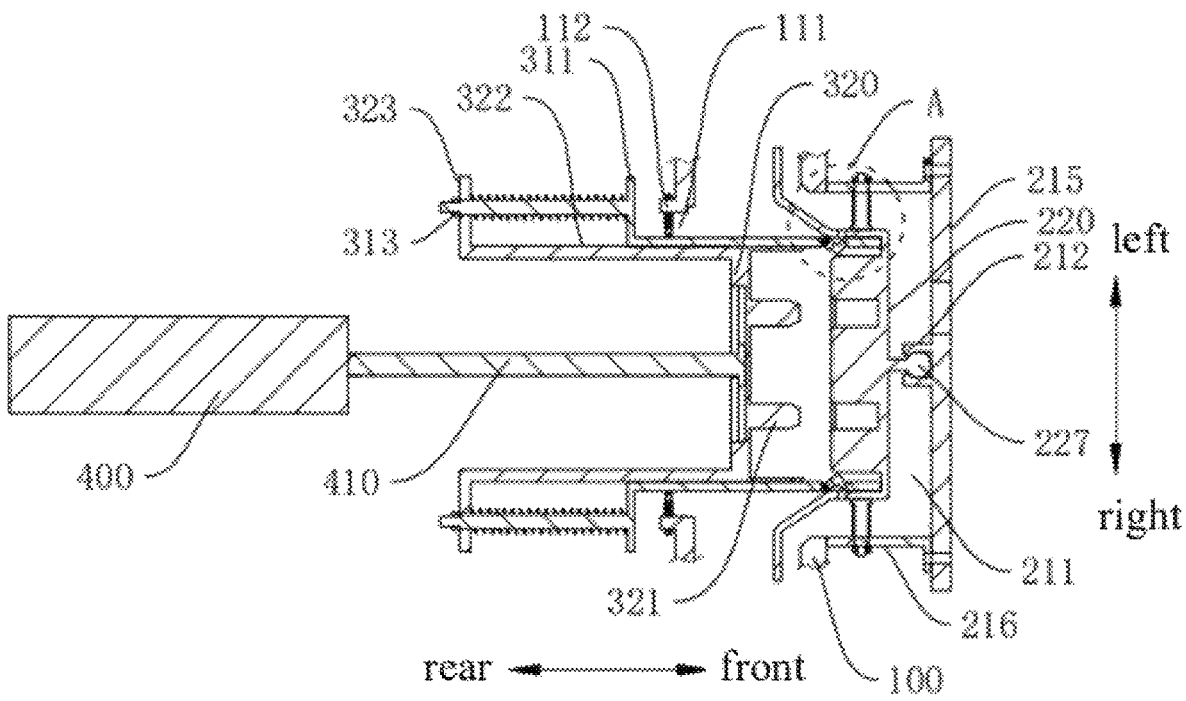
FIG. 10 is a schematic view of one of states during the plug assembly being inserted into the charging port assembly.
Figure 12:
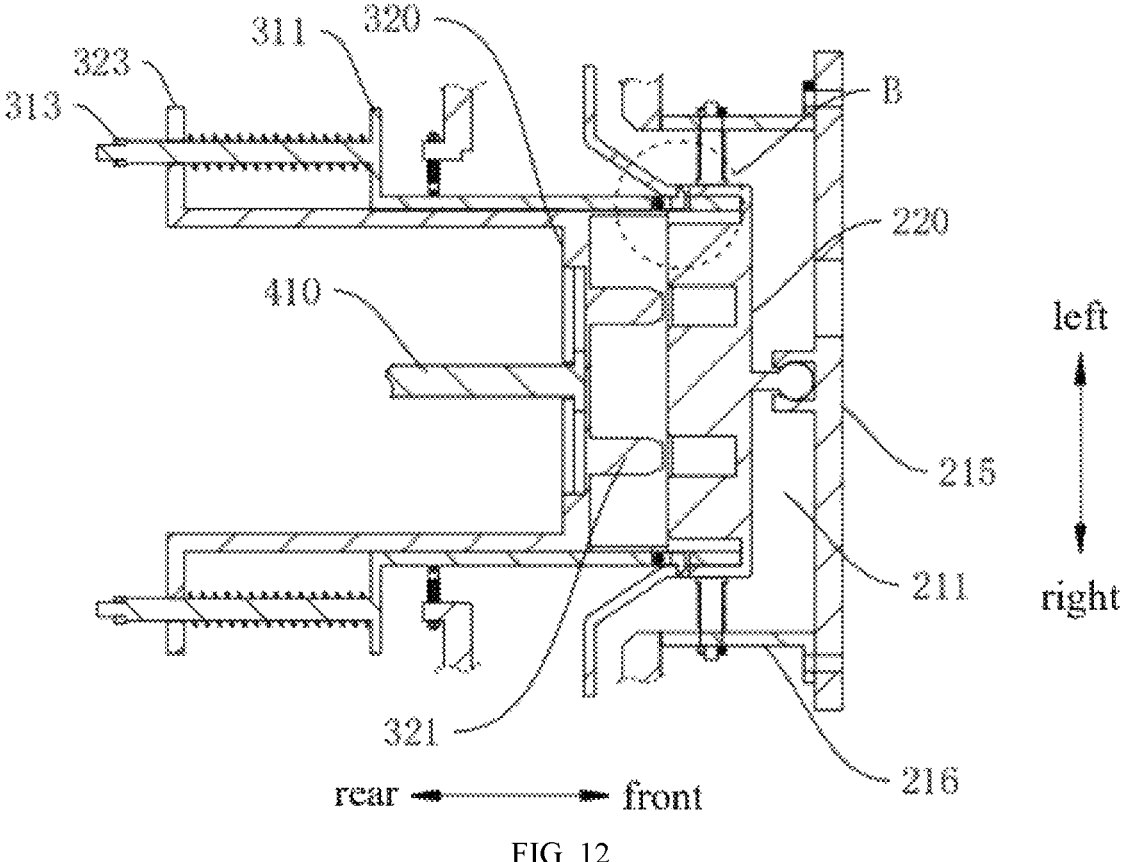
FIG. 12 is a schematic view of another state during the plug assembly being inserted into the charging port assembly.

In further embodiments of the present disclosure, the sidewall of the alignment frame 310 is provided with a through hole 314 for mounting the buckle 340. The buckle 340 is hinged in the through hole 314 through a hinge shaft, and a torsion spring is mounted on the hinge shaft to keep the buckle 340 in the retracted state without external force. As shown in FIG. 11, when the buckle 340 is in the retracted state, the buckle 340 corresponds to the position of the alignment slot 222 and can be moved into the alignment slot 222 along with the alignment frame 310. As shown in FIGS. 10 and 12, when the front end of the alignment frame 310 resists against the alignment slot 222 of another mobile charging device, the through hole 314 is partially aligned with the clamping slot 223. At this time, movement forward of the charging plug 320 can push the hook portion 341 of the buckle 340 to rotate into the clamping slot 223.

Of course, in some other embodiments, the torsion spring can keep the buckle 340 in a clamped state without external force. When being inserted, due to an inclined guide surface of the hook portion 341, the hook portion 341 can be retracted elastically when in contact with the sidewall of the alignment slot 222, avoiding interference between structures.

In further embodiments of the present disclosure, both left and right edges on the inner side of the plug hole 111 are provided with convex blocks 112, which are used to resist against the second outer plate 311 to limit the travel of the alignment frame 310 extending out of the plug hole 111. The convex blocks 112 on both sides are provided with first elastic components, which are used to apply elastic forces to the left and right sides of the alignment frame 310, so that the plug assembly 300 can move elastically in left and right directions, and remain in a centre position of the plug hole 111 when not subjected to external forces.

The following is a description of the insertion process of the plug assembly 300 into the movable base 220 of another mobile charging device, in conjunction with FIGS. 10 to 15.

Figure 14:
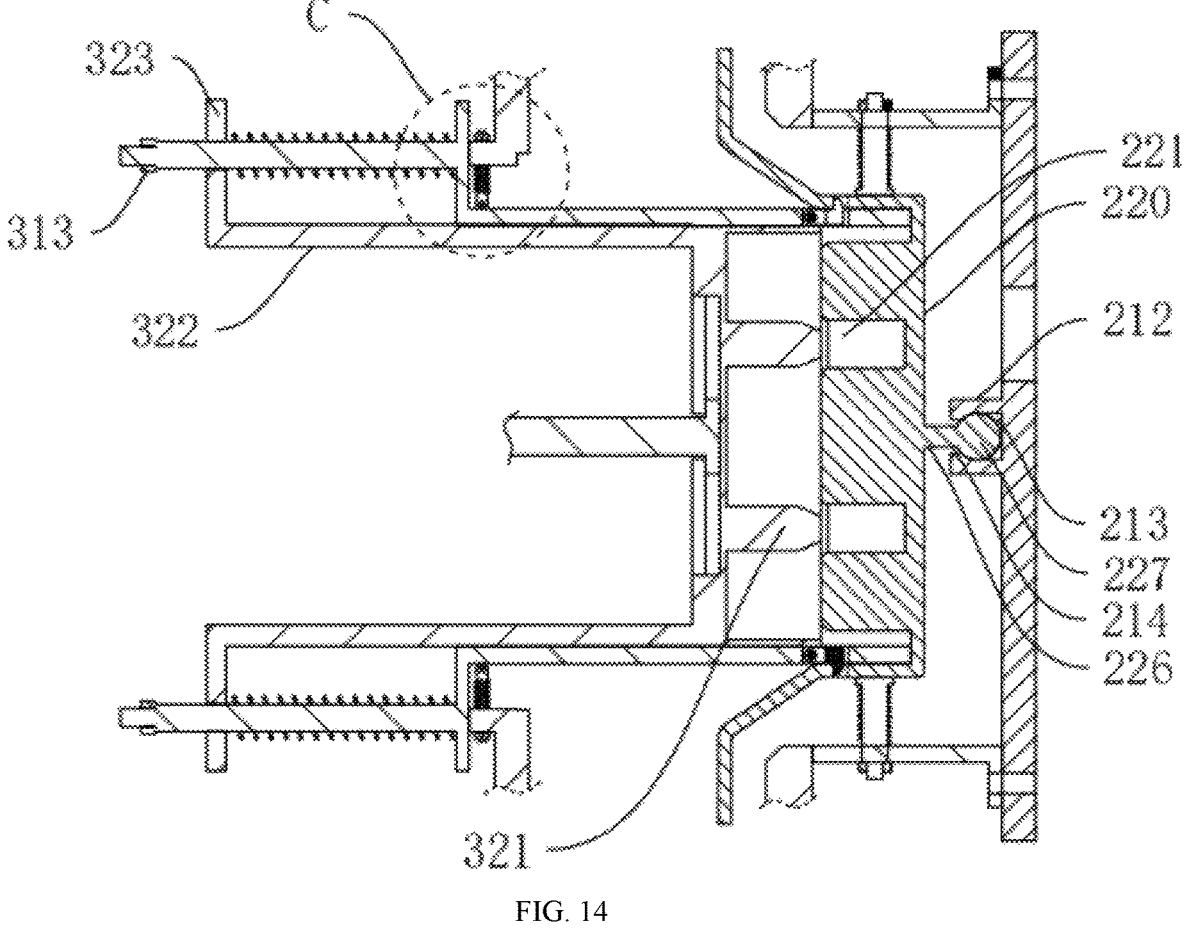
FIG. 14 is a schematic view of another state during the plug assembly being inserted into the charging port assembly.
Figure 15:
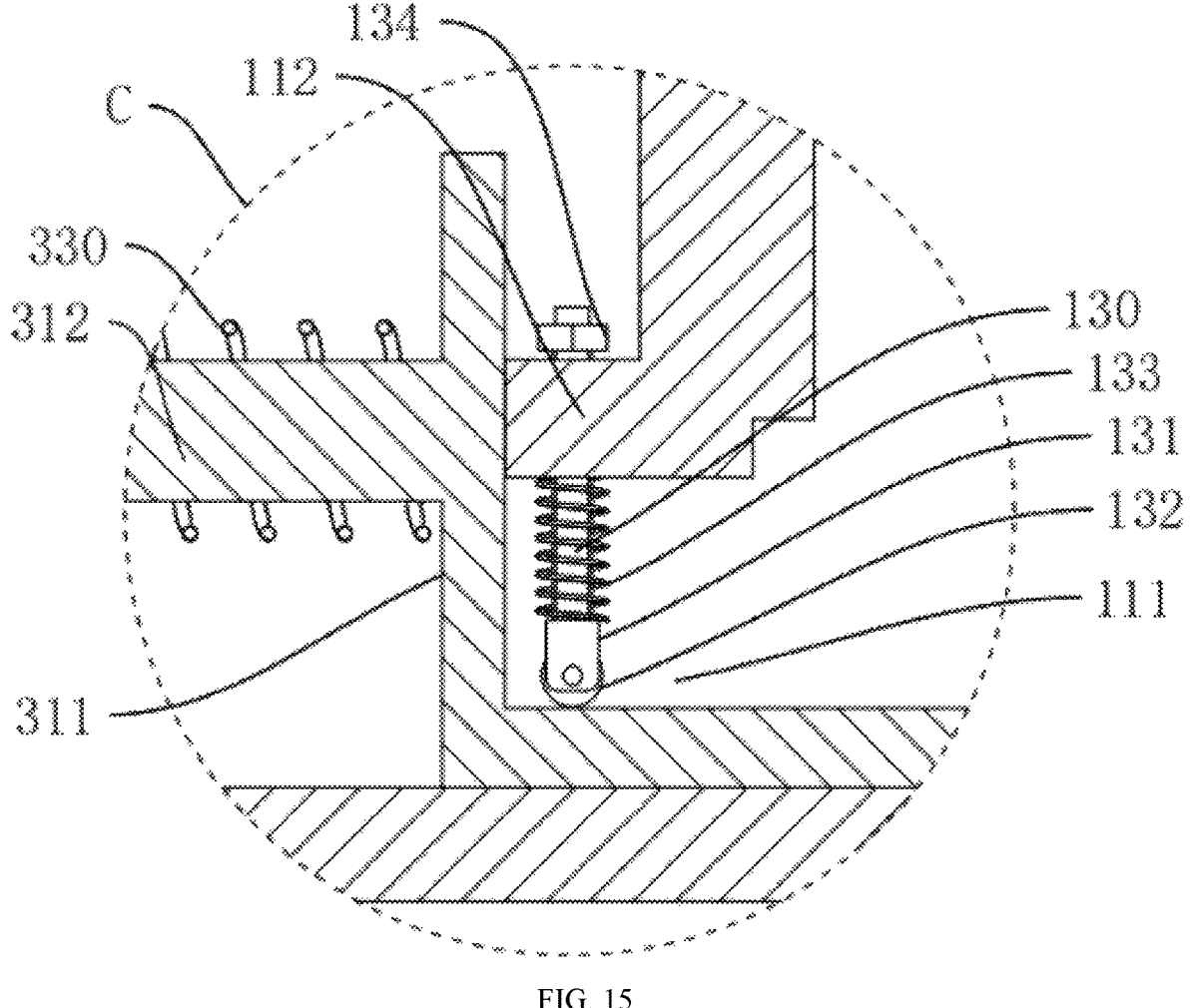
FIG. 15 is an enlarged view of the portion C shown in FIG. 14.

Firstly, the driving mechanism 400 drives the charging plug 320 and the alignment frame 310 to move forward together, and the front end of the alignment frame 310 protrudes out of the charging plug 320. If the alignment frame 310 is misaligned with the alignment slot 222, the alignment frame 310 first contacts the flared frame 225 of said another mobile charging device. If there is a left and right alignment deviation, the alignment frame 310 will automatically adjust its position in left and right directions. If there is a height alignment deviation, the movable base 220 will automatically adjust its position in up and down directions. If there is an angle deviation, the movable base 220 rotates along the ball 227 to change the angle to adapt to the insertion angle of the alignment frame 310. As the alignment frame 310 continues to move forward, the alignment frame 310 is embedded in the alignment slot 222 of another mobile charging device, achieving alignment between the pins 321 of the charging plug 320 and the charging interface 221 of another mobile charging device, until the front end of the alignment frame 310 resists against the front sidewall of the alignment slot 222 of another mobile charging device, reaching the state shown in FIG. 10. At this time, the through hole 314 is partially aligned with the clamping slot 223. The charging plug 320 continues to move forward and compresses the first spring 330 until the charging plug 320 contacts the buckle 340 and gradually switches the buckle 340 from the retracted state to the clamped state, reaching the state shown in FIG. 12, thereby locking the alignment frame 310 and the movable base 220 of another mobile charging device. And then the pins 321 are inserted into the charging interface 221 of another mobile charging device. Usually, the pins 321 has a high resistance when being inserted into the charging interface 221, which may cause the two mobile charging devices to move away from each other. When the two mobile charging devices move away from each other until the convex block 112 resists against the second outer plate 311, the state shown in FIG. 14 is reached, where the two mobile charging devices cannot move away from each other. The driving mechanism 400 continues to push the charging plug 320 forward, which can insert the pins 321 into the charging interface 221 of another mobile charging device to achieve charging docking.

In the specific embodiment of the present disclosure, the first elastic component includes a polygonal column 130, the convex block 112 is provided with polygonal holes extending in the left and right directions, and the polygonal holes are adapted to the contour of the polygonal column 130. One end of the polygonal column 130 facing the alignment frame 310 is provided with an end seat 131, and a pulley 132 is rotationally arranged on the end seat 131. A rotation axis of the pulley 132 is vertical, and the pulley 132 is in contact with the sidewall of the alignment frame 310. When the alignment frame 310 moves back and forth, the pulley 132 can reduce friction applied to the alignment frame 310, thereby avoiding obstruction in its forward and backward movement. The polygonal column 130 is sleeved with a second pressure spring 133, which is arranged between the convex block 112 and the end seat 131 to provide an elastic force to the end seat 131. One end of the polygonal column 130 facing away from the alignment frame 310 passes through the convex block 112 and is connected to a third limit nut 134, thereby limiting the elastic movement stroke of the end seat 131. The coordination between the polygonal hole and the polygonal column 130 prevents the polygonal column 130 from rotating, thereby keeping the rotation axis of the pulley 132 vertical. It allows the pulley 132 to rotate to play its role effectively when the alignment frame 310 move back and forth.

Referring to FIG. 7, the driving mechanism 400 can be a telescopic driving mechanism, such as a telescopic motor, an electric push rod, and other driving structures with telescopic driving capabilities. The driving mechanism 400 is provided with a retractable telescopic rod 410. The end of the telescopic rod 410 is provided with a limit head 411 with a contour larger than that of the telescopic rod 410. The charging plug 320 is provided with an open groove 325 having an upper opening on the rear side thereof, and a middle of a rear sidewall of the open groove 325 is provided with a strip opening 326 extending in left and right directions. A middle part of the strip opening 326 is provided with a passage 327 extending upwards. The limit head 411 is embedded in the open groove 325 and can move left and right within the open groove 325, The telescopic rod 410 passes through the passage 327 and enters the strip opening 326. A width of the strip opening 326 is greater than or equal to a diameter of the telescopic rod 410, and a diameter of the limit head 411 is greater than the width of the strip opening 326. The telescopic rod 410 can move left and right along the strip opening 326. Of course, in order to reduce friction, the limit head 411 can be arranged to be rotatably mounted at a distal end of the telescopic rod 410, thereby reducing sliding friction. In order to support retracted alignment frame 310, a bottom support block is provided at the bottom of the accommodating chamber 110 to support the alignment frame 310, and an upper surface of the bottom support block is flush with an edge of the lower end of the plug hole 111. Of course, a cover 150 can be hinged on an upper edge of the plug hole 111, allowing the plug assembly 300 to contract to the accommodating chamber 110. The cover 150 can automatically close the plug hole 111, providing a certain sealing and dust prevention effect.

The present disclosure also provides a mobile charging method, which includes the following steps: moving the mobile charging device to a device to be charged, and inserting the charging gun 120 into the charging port of the device to be charged, and charging the device to be charged; when the battery of a mobile charging device that is charging the device to be charged falls below a predetermined threshold, it is marked as a low battery charging device; drive another mobile charging device to move next to the low battery charging device, and insert the pins 321 of said another mobile charging device into the charging interface 221 of the low battery charging device to charge the low battery charging device, thereby providing continuous power to the device to be charged without plugging and unplugging the charging port multiple times, and the device to be charged can be continuously replenished without interrupt.

It can be understood that mobile charging device can be equipped with sensors, central control chips to avoid obstacles during walking, positioning chips to achieve position positioning monitoring, and in conjunction with inertial navigation modules to achieve attitude detection and correction functions. In order to facilitate information transmission, the mobile charging device can be equipped with Bluetooth® modules and WiFi® modules to exchange information with external devices, thus facilitating remote control.

The above are only exemplary embodiments of the present disclosure and are not intended to limit it. For those skilled in the art, the present disclosure may undergo various modifications and variations. Any modifications, equivalent substitutions, improvements, etc. made within the spirit and principles of this disclosure shall be included within the scope of protection of this invention.

What is claimed is:

1. A mobile charging device, comprising:

a mobile vehicle body (100), defining an accommodating chamber (110) configured to accommodate a rechargeable battery, the mobile vehicle body (100) is provided with a charging gun (120) configured to charge an external device, the accommodating chamber (110) defines a plug hole (111) at a sidewall thereof;

a charging port assembly (200), arranged in the accommodating chamber (110), comprising a mounting base (210) and a movable base (220), the mounting base (210) is fixedly connected with the mobile vehicle body (100), the movable base (220) is configured to move back and forth relative to the mounting base (210) in a first direction, the movable base (220) is provided with a charging interface (221) facing outside of the charging port assembly (200);

a plug assembly (300), movably arranged in the plug hole (111), a charging plug (320) having pins (321) adapted to the charging interface (221), the charging plug (320) is configured to move back and forth relative to the mobile vehicle body (100) in a second direction, the second direction is perpendicular to the first direction; and a driving mechanism (400) in the accommodating chamber (110) and is connected with the charging plug (320), and is configured to drive the charging plug (320) to move in the plug hole (111);

wherein the driving mechanism (400) is configured to drive the charging plug (320) and the pins (321) to move out of the plug hole (111) to insert into a charging interface (221) of another mobile charging device to charge said another mobile charging device.

2. The mobile charging device of claim 1, wherein the plug assembly (300) further comprises an alignment frame (310); the alignment frame (310) is arranged around the charging plug (320); the movable base (220) is provided with an alignment slot (222) around the charging interface (221), the alignment slot (222) faces outside to allow the alignment frame (310) to insert therein; when the plug assembly (300) is inserted into the movable base (220) of said another mobile charging device, the alignment frame (310) cooperates with the alignment slot (222) to make the pins (321) to be aligned with the charging interface (221) of said another mobile charging device.

3. The mobile charging device of claim 2, wherein the first direction is vertical, the second direction is left and right horizontal, and the plug hole (111) is arranged on a front side of the mobile vehicle body.

4. The mobile charging device of claim 3, wherein two extension plates (322) extend from left and right sides of the alignment frame (310) respectively, and two first outer plates (323) are provided at rear ends of the two extension plates (322) respectively, two second outer plates (311) are arranged on left and right sides of a rear end of the alignment frame (310), and first springs (300) are arranged between the first outer plate (323) and the second outer plates (311).

5. The mobile charging device of claim 4, wherein two first guiding columns (312) extend backwards from the second outer plates (311) respectively, the first outer plate (323) is provided with first guide holes (324) configured to allow the first guiding columns (312) to pass through, rear ends of the first guiding columns (312) passes through the first guide holes (324) and are connected to first limit nuts (313) respectively, a size of each first limit nut (313) is greater than that of a corresponding first guide hole (324), each first spring (330) is a compression spring sleeving on a corresponding first guide column (312), two opposite ends of each compression spring resists against a corresponding first outer plate (323) and a corresponding second outer plate (311).

6. The mobile charging device of claim 2, wherein a sidewall of the alignment slot (222) is provided with a clamping slot (223), a sidewall of the alignment frame (310) is provided with a buckle (340), the buckle (340) is configured to be switchable between a retracted state where the buckle (340) is retracted within the alignment frame (310) and a clamped state where the buckle (340) partially extends into the clamping slot (223); when a front end of the alignment frame (310) is inserted into the alignment slot (222) of said another mobile charging device and resists against the front sidewall of the alignment slot (222), the charging plug (320) continues to move forward relative to the alignment frame (310), which pushes the buckle (340) to be switched from the retracted state to the clamped state, the buckle (340) in the clamped state cooperates with the clamping slot (223) of said another mobile charging device, which limit relative movement between the alignment frame (310) and the movable base (220) in forward and backward directions; after the charging plug (320) pushes the buckle (340) to the clamped state, the charging plug (320) continues to move forward to insert the pins (321) into the charging interface (221) of said another mobile charging device.

7. The mobile charging device of claim 6, wherein a sidewall of the alignment frame (310) is provided with a through hole (314) for mounting the buckle (340), the buckle (340) is hinged in the through hole (314) through a hinge shaft, and a torsion spring is mounted on the hinge shaft to keep the buckle (340) in the retracted state without external force.

8. The mobile charging device of claim 1, wherein both left and right edges on the inner side of the plug hole (111) are provided with convex blocks (112) configured to resist against the second outer plate (311) to limit travel of the alignment frame (310) extending out of the plug hole (111), the convex blocks (112) on both sides are provided with first elastic components configured to apply elastic forces to left and right sides of the alignment frame (310).

9. The mobile charging device of claim 1, wherein the charging port assembly (200) comprises a second elastic component (230); the charging port assembly (200) is mounted on a rear side of the mobile vehicle body (100);

a front end of the movable base (220) is sequentially connected with a connecting column (226) and a ball (227), and the movable base (220) is configured to rotate along the ball (227) relative to the mounting base (210);

the mounting base (210) is provided with a mounting chamber (211) having an opening at a rear end thereof, a front sidewall of the mounting chamber (211) is provided with a sliding bar (212) extending in the first direction, the sliding bar (212) defines a sliding slot (213) configured to allow the ball (227) to move in the first direction, and a rear end of the sliding slot (213) is provided with an opening (214) configured to allow the connecting column (226) to extend out of the sliding slot (213), a width of the opening (214) is greater than a width of the connecting column (226) and smaller than a diameter of the ball (227); and the number of the second elastic component (230) is multiple, multiple second elastic components (230) are distributed circumferentially on an inner sidewall of the mounting chamber (211) and configured to provide elastic forces to the movable base (220) when compressed.

10. A mobile charging method, comprising following steps:

moving the mobile charging device of claim 1 to a device to be charged, and inserting the charging gun (120) into a charging port of the device to be charged;

marking when the mobile charging device to be a low battery charging device when the battery of the mobile charging device falls below a predetermined threshold; and driving another mobile charging device to move next to the low battery charging device, and insert the pins (321) of said another mobile charging device into the charging interface (221) of the low battery charging device to charge the low battery charging device.

\* \* \* \* \*